US006975307B2

(12) United States Patent
Chang et al.

(10) Patent No.: US 6,975,307 B2

(45) Date of Patent: Dec. 13, 2005

(54) METHOD FOR DETECTING TOUCH-POINT COORDINATE FOR USE IN A RESISTIVE TOUCH PANEL

(75) Inventors: Wei-Chih Chang, Taipei (TW); Yuan-Jie Shiang, Banchiau (TW); Shu-Hung Tseng, Taipei (TW); Chang-Mien Yang, Banchiau (TW)

(73) Assignee: High Tech Computer, Corp., Taoyuan (TW)

( * ) Notice: Subject to any disclaimer, the term of this patent is extended or adjusted under 35 U.S.C. 154(b) by 342 days.

(21) Appl. No.: 10/268,704

(22) Filed: Oct. 11, 2002

(65) Prior Publication Data

US 2003/0071797 A1 Apr. 17, 2003

(30) Foreign Application Priority Data

Oct. 12, 2001 (TW) ....................................... 90125327 A

(51) Int. Cl.[7] .................................................. G09G 5/00

(52) U.S. Cl. .................................... 345/174; 178/18.01

(58) Field of Search ............. 345/174; 178/18.01–18.11

(56) References Cited

U.S. PATENT DOCUMENTS

| | | | |
|---|---|---|---|
| 5,453,941 A | | 9/1995 | Yoshikawa |
| 5,631,741 A | * | 5/1997 | Matthews .................... 358/296 |
| 5,659,154 A | | 8/1997 | Yoshikawa |
| 6,208,332 B1 | * | 3/2001 | Ikegami ....................... 345/174 |
| 6,246,394 B1 | * | 6/2001 | Kalthoff et al. ............. 345/173 |
| 2002/0010407 A1 | | 1/2002 | Berelovich et al. |

FOREIGN PATENT DOCUMENTS

| | | |
|---|---|---|
| EP | 0309946 A2 | 9/1988 |

* cited by examiner

*Primary Examiner*—Richard Hjerpe

*Assistant Examiner*—Ke Xiao

(74) *Attorney, Agent, or Firm*—Rabin & Berdo, P.C.

(57) ABSTRACT

A touch-point detecting method is applicable to a resistive touch panel with a touch-point detecting apparatus comprising a plurality of switches. By selectively enabling and disabling those switches, the present method comprises the steps of determining whether an external force is exerted on the touch panel, determining whether the external force is within a predetermined threshold, producing X-coordinate, and producing Y-coordinate.

19 Claims, 6 Drawing Sheets

VCY
RPY
410
402
VCX
VCC
RPX
R1
404
RY1
RM
P1
TP
C
R2
B
RX1
P2
RX0
Y
RY0
X
TY
408
TX
A
406

METHOD FOR DETECTING TOUCH-POINT COORDINATE FOR USE IN A RESISTIVE TOUCH PANEL

This application incorporates by reference Taiwan application Serial No. 090125327, filed on Oct. 12, 2001.

BACKGROUND OF THE INVENTION

1. Field of the Invention

The invention relates in general to a touch panel, and more particularly to a method for detecting touch-point coordinate for use in a resistive touch panel.

2. Description of the Related Art

The Personal Digital Assistance (PDA) becomes more and more popular than the conventional notebook due to its portability and multi-function.

A typical PDA 100 is shown in FIG. 1. The PDA 100 includes a base 102, a touch panel 104, a control switch 106, and a stylus 108, wherein the touch panel 104 is positioned on the top surface of the base 102. The user can operate the PDA 100 by touching the touch panel 104 with stylus 108.

The touch panels can be categorized into two types: capacitive type and resistive type. FIG. 2 illustrates a resistive touch panel formed with an X plate 202 and a Y plate 204 being disposed apart. Both the X plate 202 and the Y plate 204 are plane resistors and are not in contact with each other if no external force is exerted on the touch panel. As the user points the stylus to the touch panel, the point P1 of the X plate 202 is attached to point P2 of the Y plate 204, wherein the touched point on the touch panel corresponds to the point P1 on the X plate 202 and the point P2 on the Y plate.

Please refer to FIG. 3; it shows the equivalent circuit of the resistive touch panel, wherein the equivalent resistor $R_M$ is produced between the X plate and the Y plate. When no external force is exerted on the touch panel, an open circuit is formed between the X plate and the Y plate, and the resistance of the equivalent resistor $R_M$ is infinity. When the X plate is attached to the Y plate by an external force, a loop is formed across the X plate and the Y plate, and the equivalent resistor $R_M$ is much smaller than infinity, wherein the equivalent resistor $R_M$ relates to the magnitude of the external force. Moreover, equivalent resistors $R_{xo}$ and $R_{x1}$ on the X plate are coupled to the point P2, wherein the magnitude of the $R_{xo}$ and $R_{x1}$ are determined by the X-coordinate of the point P2, not the Y-coordinate of the point P2. Likewise, the two equivalent resistor $R_{yo}$ and $R_{y1}$ on the Y plate are coupled to the point P1, wherein the magnitude of the $R_{yo}$ and $R_{y1}$ are determined by the Y-coordinate of the point P1, not the X-coordinate of the point P2.

Generally, a touch-point detecting apparatus is employed to determine the coordinates of the touched point on the touch panel. If the stylus touches the touch panel too lightly, the contact status between the Y plate and the X plate will be unstable, and the corresponding equivalent resistor $R_M$ will be different with that resulting from normally pressed. In this case, the detection result is in error and accordingly may cause the PDA to operate in wrong status.

SUMMARY OF THE INVENTION

It is therefore an object of the invention to provide a touch-point detecting method, applicable to a resistive touch panel, to solve the problem that the coordinate of the touch-point detected by the touch-point detecting apparatus can be wrong when an external force given to the stylus for touching the touch panel is exerted too lightly to be identified.

In accordance with the object of the invention, a touch-point detecting method is disclosed, wherein the touch-point detecting apparatus comprises a plurality of switches and a plurality of external resistors, and is coupled to two power supplies and two touch-panel resistors of the touch panel. The two power supplies are used for respectively applying constant voltages to two touch-panel resistors. By selectively enabling and disabling the switches, the touch-point detecting method comprises the steps of: determining whether an external force is exerted on the resistive touch panel according to a pressure detection signal, if so, proceeding to the next step; determining whether the external force is effective according to a first signal and a second signal that are produced by a comparing process, if so, proceeding with the next step; producing a first coordinate signal by performing first-coordinate detecting of a touch point at which the external force is exerted on the resistive touch panel, wherein the first coordinate signal indicates a first coordinate of the touch point; producing a second coordinate signal by performing second-coordinate detecting of the touch point at which the external force is exerted on the resistive touch panel, wherein the second coordinate signal indicates a second coordinate of the touch point.

BRIEF DESCRIPTION OF THE DRAWINGS

Other objects, features, and advantages of the invention will become apparent from the following detailed description of the preferred but non-limiting embodiments. The description is made with reference to the accompanying drawings.

DESCRIPTION OF THE PREFERRED EMBODIMENT

Figure 1:
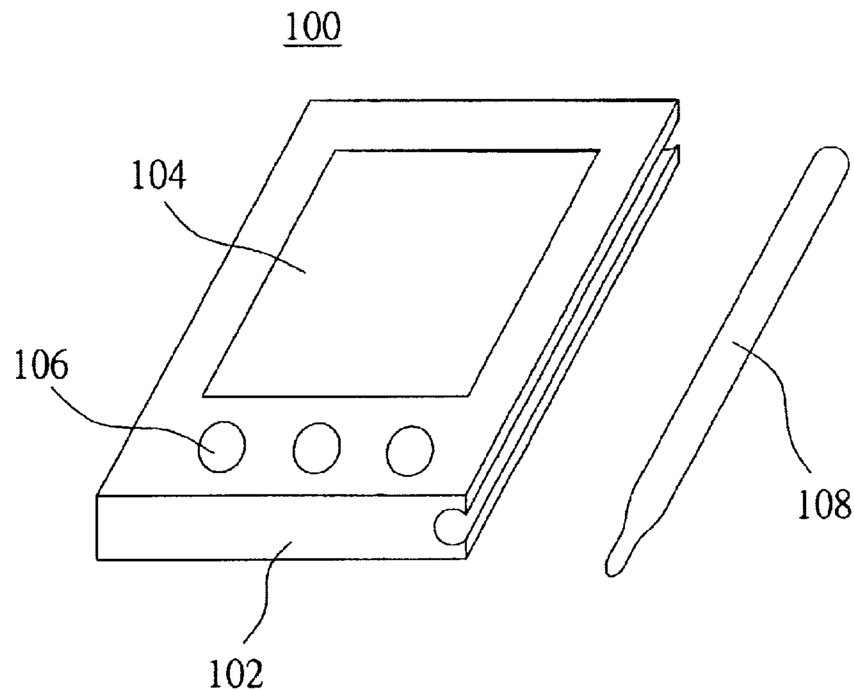
FIG. 1 shows a PDA.
Figure 2:
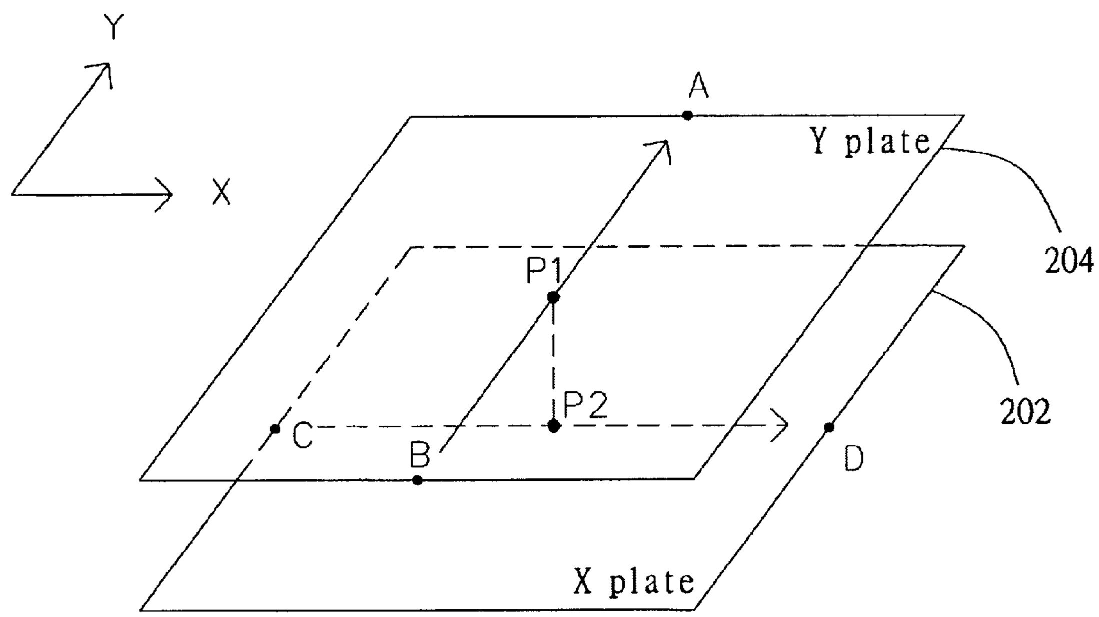
FIG. 2 illustrates the structure of a typical resistive touch panel.
Figure 3:
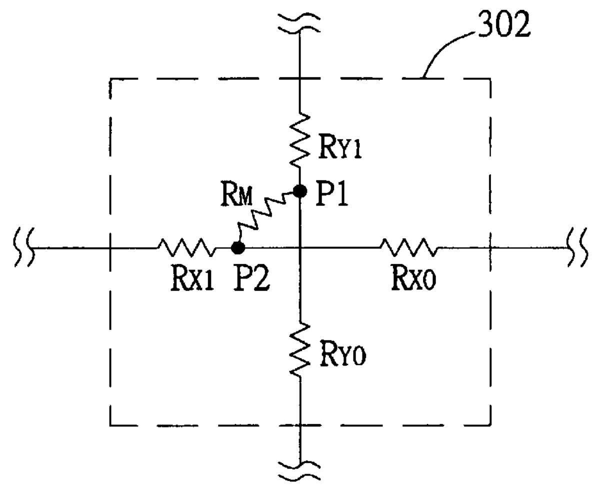
FIG. 3 shows the equivalent circuit of the resistive touch panel, wherein the equivalent resistor $R_M$ is produced between the X plate and the Y plate.
Figure 4:
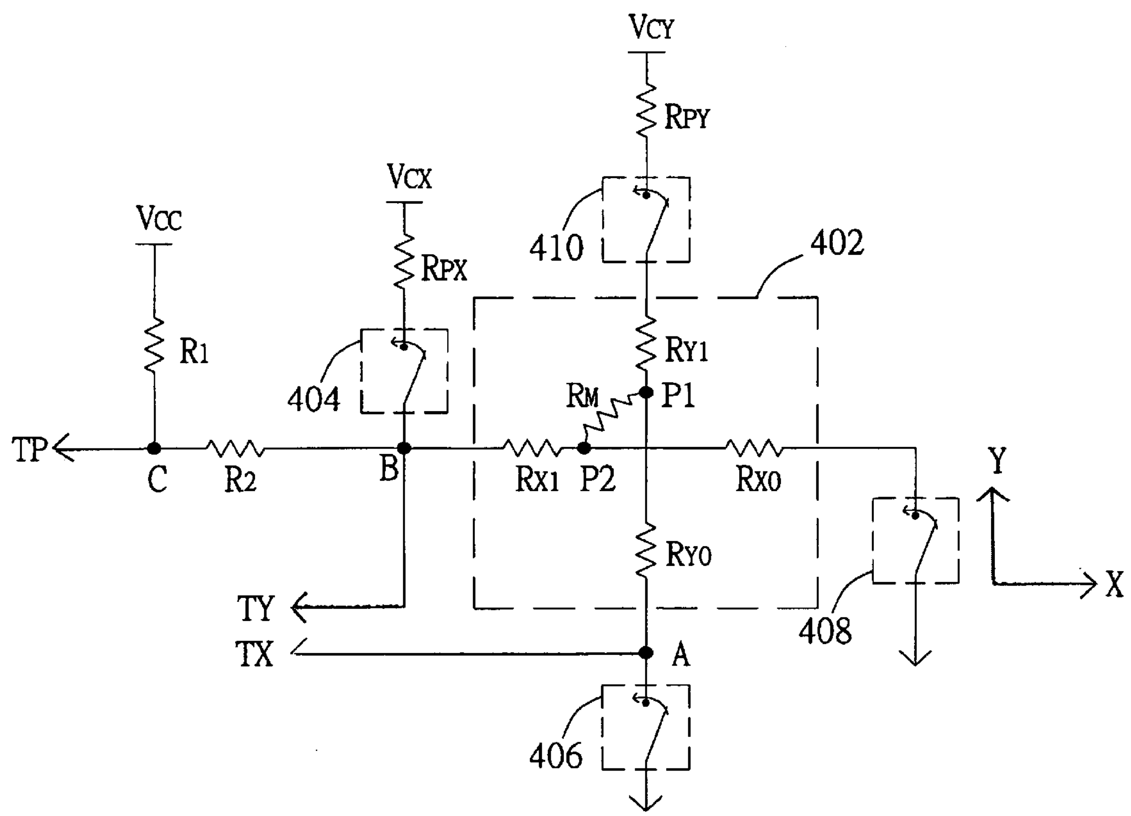
FIG. 4 shows the equivalent circuit of the touch-point detecting apparatus for the resistive touch panel according to the preferred embodiment of the present invention.

FIG. 4 shows an equivalent circuit of a touch-point location detecting apparatus for a resistive touch panel 402 according to the preferred embodiment of the present invention. In FIG. 4, nodes A, B, C are used as the output terminals of the touch-point detecting apparatus. These nodes can be connected to the post-stage signal processing apparatus, for example. The touch-point detecting apparatus is coupled to the external power supplies $V_{CX}$, $V_{CY}$ and the resistive touch panel 402, and comprises switches 404, 406, 408, 410, and external resistors $R_{PX}$, $R_{PY}$, $R_1$, and $R_2$, wherein switches 404, 408 are coupled to the X plate, switches 406, 410 are coupled to the Y plate, and switches 404, 410 are respectively coupled to the external resistors $R_{PX}$, $R_{PY}$. The external powers $V_{CX}$, $V_{CY}$ are, respectively, coupled to the external resistors $R_{PX}$, $R_{PY}$ for supplying constant voltage to the X plate and the Y plate. The external resistor $R_2$ is coupled to the external resistor $R_1$ and one of the X plate and the Y plate. In this embodiment, the external resistor $R_2$ is coupled to the X plate.

In the present invention, the touch-point location detecting method comprises four steps: determining whether an external force is exerted on the touch panel 402, determining whether the external force is effective external force, detecting X-coordinate of the touch point, and detecting Y-coordinate of the touch point. The equivalent circuits, corresponding to the four steps, are respectively shown in FIG. 5, FIG. 6, FIG. 7A, and FIG. 7B.

Figure 5:
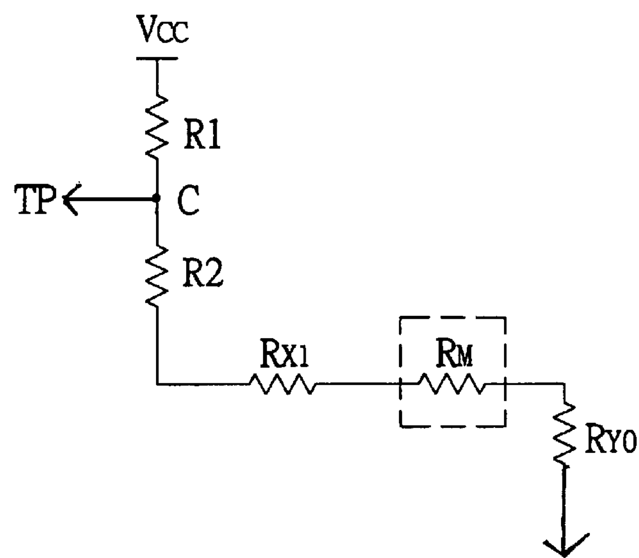
FIG. 5 shows the equivalent circuit of the touch-point detecting apparatus during the step of determining whether an external force is exerted on the touch panel.

FIG. 5 illustrates the equivalent circuit of the touch-point apparatus during the step of determining whether an external force is exerted on the touch panel 402, wherein switch 406 is enabled and switches 404, 408, 410 are disabled. As the X plate and Y plate are not in contact with each other, the voltage Vc at the node C will to Vcc, corresponding to a logic HIGH, owing to the resistance of the equivalent resistor $R_M$ across the two plates being infinite. When the X plate is in contact with Y plate, the voltage signal TP at the node C will be much lower than Vcc, corresponding to a logic LOW, due to the formation of the loop across the X and Y planes with the finite equivalent resistor $R_M$ produced in the contact thereof. Therefore, a detecting as to whether an external force is exerted on the touch panel can be made according to the voltage signal TP.

Figure 6:
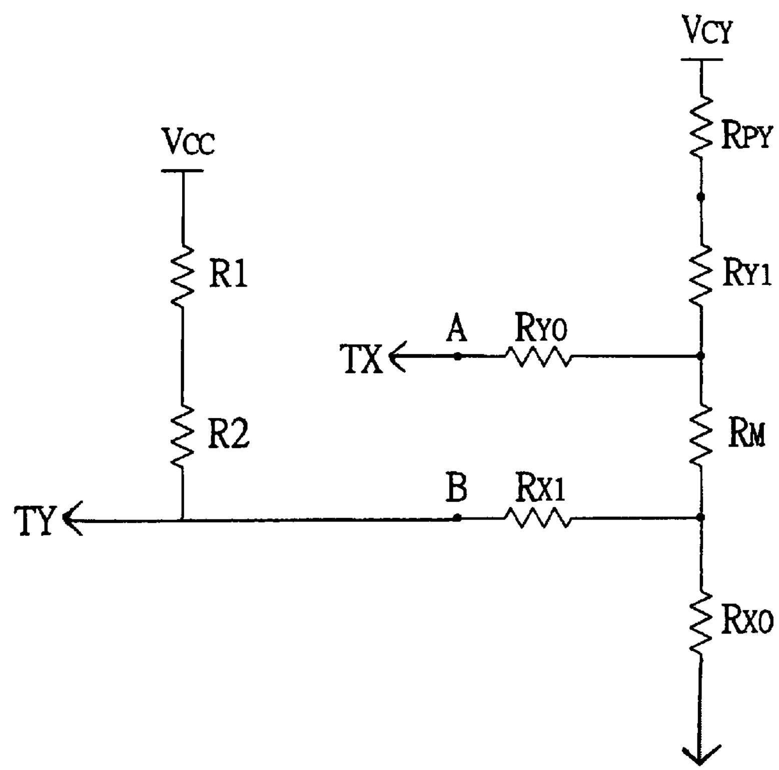
FIG. 6 shows the equivalent circuit of the touch-point position-test apparatus during the step of determining whether the external force is effective external force.

FIG. 6 illustrates the equivalent circuit of the touch-point detecting apparatus during the step of determining whether the external force is effective external force, wherein switches 408, 410 are enabled and switches 404, 406 are disabled. The voltage signals TX, TY are outputted from nodes A and B, respectively. If an external force is normally exerted on the touch panel, the resistance of the equivalent resistor RM and the difference between the voltage signals TX and TY will be much smaller than those resulting from no external force. If an external force is lightly exerted on the touch panel 402, the resistance of the equivalent resistor $R_M$ and the voltage difference will be larger than those resulting from a normal external force and smaller than those resulting from no external force.

When determining whether the external force is effective external force, the voltage difference between the voltage signals TX and TY is compared with the pre-determined threshold value of the voltage difference so as to determine whether the external force is effective. The external force will be determined as an effective external force if the voltage difference between the voltage signals TX and TY is smaller than the pre-determined threshold value. Conversely, the external force will not be regarded as an effective external force to indicate instructions if the voltage difference between the voltage signals TX and TY is larger than the pre-determined threshold. In this case, the touch-point detecting apparatus ends the touch-point detecting method, which can avoid any erroneous operation and erroneous display resulting from error voltage signals TX or TY.

Figure 7A:
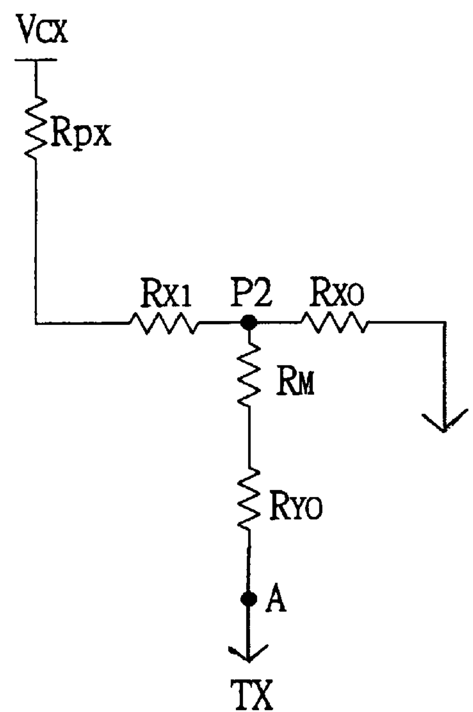
FIG. 7A shows the equivalent circuit of the touch-point detecting apparatus during the step of detecting X-coordinate of the touch point.

FIG. 7A illustrates the equivalent circuit of the touch-point detecting apparatus during the step of detecting the X-coordinate of the touch point, wherein switches 404, 408 are enabled and switches 406, 410 are disabled. The voltage $V_A$ at node A relates to the ratio of equivalent resistor $R_{X0}$ to equivalent resistor $R_{X1}$ on the X plate, wherein the ratio is determined by the X-coordinate. Therefore, the voltage signal TX at the node A indicates the X-coordinate of a touch point on which the external force is exerted.

Figure 7B:
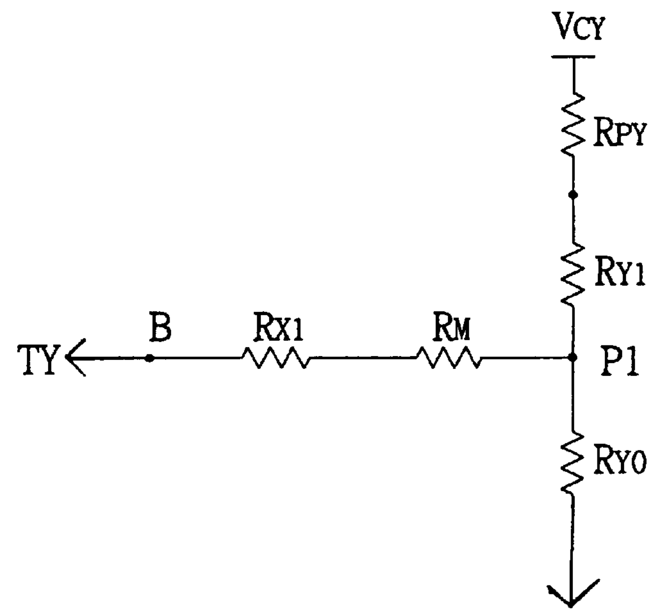
FIG. 7B shows the equivalent circuit of the touch-point detecting apparatus during the step of detecting Y-coordinate of the touch point.

Please refer to FIG. 7B, it shows the equivalent circuit of the touch-point detecting apparatus during the step of detecting the Y-coordinate of the touch point, wherein switches 406, 410 are enabled and switches 404, 408 are disabled. The voltage $V_B$ on node B is related with the ratio of equivalent resistor $R_{Y0}$ to equivalent resistor $R_{Y1}$ on the Y plate, wherein the ratio is determined by the Y-coordinate. Therefore, the voltage signal TY outputted from the node B indicates the Y-coordinate, on which the external force is imposed on the touch panel 402.

It should be noted that the touch-point detecting method is not limited to implementing the step of detecting X-coordinate first and then the step of detecting Y-coordinate. To interchange these two steps is also applicable in the present invention. Moreover, the step of determining whether the external force is effective external force can also be implemented between the steps of detecting X-coordinate and detecting Y-coordinate again and after the two coordination-drawing steps. Besides, The pressure comparison step for determining whether the external force is effective external force can be implemented for three times, between which other steps of the present method can be implemented. In the present invention, all embodiments of the touch-point detecting method comprises the sequences of CXY (CYX), XCY (YCX), XYC (YXC), CXCY (CYCX), CXYC (CYXC), XCYC (YCXC), CXCYC (CYCXC), wherein the C, X and Y represent the steps of determining whether the external force is effective external force, detecting X-coordinate of the touch point, and detecting Y-coordinate of the touch point respectively.

Figure 8:
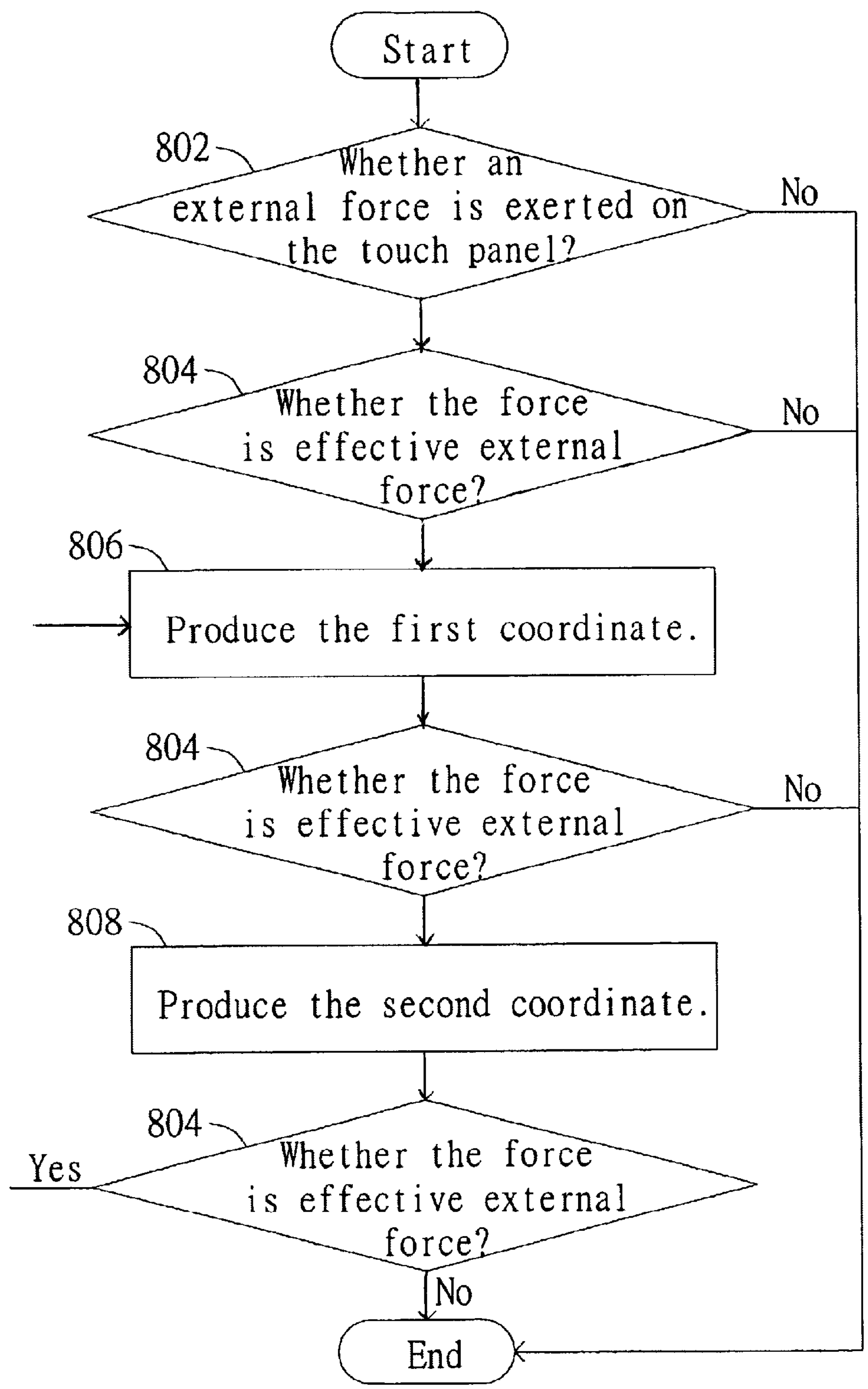
FIG. 8 shows the flow chart of the preferred embodiment for the touch-point detecting method.

Please refer to FIG. 8, it shows the flow chart of the preferred embodiment for the touch-point detecting method. Firstly, in step 802 of pressure detection, the touch-point detecting apparatus determines whether an external force is exerted on the touch panel. If not, the method is finished. If so, then the step 804 is executed. In step 804, whether the external force is effective external force. Next, producing a first coordinate and producing a second coordinate are respectively executed in step 806 and step 808, wherein the first coordinate can be X-coordinate or Y-coordinate. Please note that the step 804 of pressure comparison is executed between step 806 and step 808 again, and after the step 808.

Figure 9:
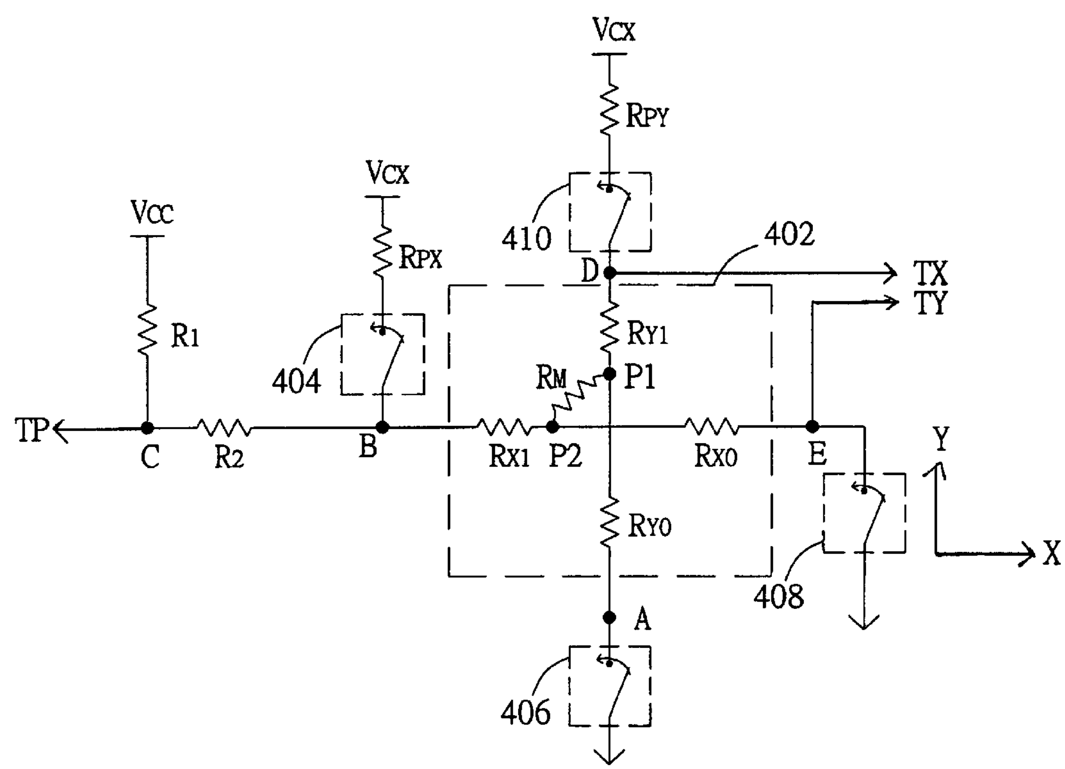
FIG. 9 shows the equivalent circuit of another touch-point detecting apparatus, wherein the configuration are almost the same as that in FIG. 4, except signals from the touch-point detecting apparatus pass through nodes C, D, and E.

FIG. 9 is an equivalent circuit of another touch-point detecting apparatus with a resistive touch panel, according to the invention. The configuration of this touch-point detecting apparatus in FIG. 9 is almost the same as that in FIG. 4, except that output signals of this example are provided through nodes C, D, and E. In the step of determining whether the external force is effective external force, the difference of the voltage signals outputted from the node D and node E, by enabling switches 404, 406, and disabling switches 408, 410, is compared with the a predetermined threshold value to determine if the external force is effective or not. In the step of detecting X-coordinate of the touch point, the voltage signal TX is outputted from node D by enabling switch 404, 408 and disabling switch 406, 410. During the step of detecting Y coordinate of the touch point, the voltage signal TY is outputted from node E by enabling switch 406, 410 and disabling switch 404, 408. The remaining step is the same as the previous embodiment.

In the present invention, the position, which an external force is exerted on the resistive touch panel, is detected by selectively enabling switches of the touch-point detecting apparatus. The present invention will determine whether an external force is exerted on the touch panel and further check if the external force is effective or not. The touch-point detecting method of the present invention can solve the problem that no bright point appears on the display or the bright point appears on the wrong position when the external force is too small.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting touch-point coordinates, applicable to a touch-point detecting apparatus for a resistive touch panel, wherein said resistive touch panel includes a first touch-panel resistor and a second touch-panel resistor, said touch-point detecting apparatus includes a plurality of switches and a plurality of resistors, and is coupled to the following five elements of a first power supply, a second power supply, said first touch-panel resistor, said second touch-panel resistor, and said resistive touch panel, and said first power supply and said second power supply are used for respectively applying constant voltages to said first touch-panel resistor and said second touch-panel resistor, said touch-point detecting apparatus comprising a first switch, a second switch, a third switch, a fourth switch, a first external resistor, a second external resistor, a third external resistor, and a fourth external resistor, wherein said third external resistor is coupled to a third power supply, said third external resistor and a first end of said fourth external resistor are coupled at a first node, said first switch and said first touch-panel resistor are coupled to a second end of said fourth external resistor at a second node, said first switch and said second switch are coupled to said first touch-panel resistor, said second switch is coupled to said first touch-panel resistor at a third node, said third switch and said fourth switch are coupled to said second touch-panel resistor at a fourth node and a fifth node respectively, and said first external resistor and said second external resistor are coupled to said first power supply and said second power supply respectively, and are coupled to said first switch and said third switch respectively, said method comprising the steps of:

detecting pressure for determining whether there is an external force exerted on the resistive touch panel according to a pressure detection signal produced by performing the detecting pressure step; if so, proceeding to the next step;

comparing pressure for determining whether said external force is effective according to a first signal and a second signal that are produced by the comparing pressure step;

detecting a first coordinate by performing first-coordinate detecting of a touch point at which the external force is exerted on the resistive touch panel, to produce a first coordinate signal indicative of the first coordinate of said touch point; and detecting a second coordinate by performing second-coordinate detecting of said touch point at which the external force is exerted on the resistive touch panel, to produce a second coordinate signal indicative of the second coordinate of said touch point.

2. The method according to claim 1, wherein said first touch-panel resistor is perpendicular to said second touch-panel resistor.

3. The method according to claim 1, wherein said first coordinate signal is determined by the relative position between said touched point and said first touch-panel resistor, said second coordination signal is determined by the relative position between said touch point and said second touch-panel resistor.

4. The method according to claim 1, wherein in said pressure detecting step, said pressure detection signal is produced by performing pressure detection for the resistive touch panel, and comprises the steps of:

enabling said second switch and disabling said first switch, said third switch, and said fourth switch; and outputting said pressure detection signal through said first node.

5. The method according to claim 1, wherein said the first coordinate detecting step, comprises the steps of:

enabling said first switch and said second switch;

disabling said third switch and said fourth switch; and outputting said first coordinate signal at either said fourth node or said fifth node.

6. The method according to claim 1, wherein said second-coordinate detecting is executed by enabling said third switch and said fourth switch and by disabling said first switch and said second switch, and said second coordination signal is outputted through either said second node or said third node.

7. The method according to claim 1, wherein said comparing pressure step further comprises the steps of:

enabling said first switch and said fourth switch;

disabling said second switch and said third switch;

producing said first signal and said second signal respectively through said third node and said fourth node; and comparing the difference between said first signal and said second signal with a predetermined threshold value.

8. The method according to claim 1, said comparing pressure step outputting said first signal and said second signal respectively through said fifth node and said second node by enabling said second switch and said third switch and by disabling said first switch and said fourth switch, wherein the difference between said first signal and said second signal is compared with a predetermined threshold value.

9. The method according to claim 1, further comprising performing said comparing pressure step between said detecting a first coordinated step and said detecting a second coordinate step.

10. The method according to claim 9, further comprising performing said comparing pressure step after said detecting a second coordinates step.

11. The method according to claim 10, further comprising performing said comparing pressure step before said detecting a first coordinate step.

12. The method according to claim 1, further comprising performing said comparing pressure step after said detecting a second coordinate step.

13. The method according to claim 1, wherein said detecting a first coordinate step and said detecting a second coordinate step are respectively a producing X coordinate step and a producing Y coordinate step.

14. The method according to claim 1, wherein said detecting a first coordinate step and said detecting a second coordinate step are respectively a producing Y coordinate step and a producing X coordinate step.

15. A method for detecting touch-point coordinates, applicable to a touch-point detecting apparatus for a resistive touch panel, wherein said resistive touch panel includes a first touch-panel resistor and a second touch-panel resistor, said touch-point detecting apparatus includes a plurality of switches and a plurality of resistors, and is coupled to the following five elements of a first power supply, a second power supply, said first touch-panel resistor, said second touch-panel resistor, and said resistive touch panel, and said first power supply and said second power supply are used for respectively applying constant voltages to said first touch-panel resistor and said second touch-panel resistor, said method comprising the steps of:

detecting pressure for determining whether there is an external force exerted on the resistive touch panel according to a pressure detection signal produced by performing the detecting pressure step; if so, proceeding to the next step;

detecting a first coordinate by performing first-coordinate detecting of a touch point at which the external force is exerted on the resistive touch panel, to produce a first coordinate signal indicative of the first coordinate of said touch point; and comparing pressure for determining whether said external force is effective according to a first signal and a second signal that are produced by the comparing pressure step, wherein said comparing pressure step is performed after said detecting a first coordinate step;

detecting a second coordinate by performing second-coordinate detecting of said touch point at which the external force is exerted on the resistive touch panel, to produce a second coordinate signal indicative of a second coordinate of said touch point.

16. The method according to claim 15, further comprising performing said comparing pressure step before said detecting a first coordinate step.

17. The method according to claim 15, further comprising performing said comparing pressure step after said detecting a second coordinate step.

18. The method according to claim 15, wherein said detecting a first coordinate step and said detecting a second coordinate step are respectively a producing X coordinate step and a producing Y coordinate step.

19. The method according to claim 15, wherein said detecting a first coordinate step and said detecting a second coordinate step are respectively a producing Y coordinate step and a producing X coordinate step.

* * * * *